United States Patent
Shin et al.

(10) Patent No.: US 8,755,524 B2
(45) Date of Patent: Jun. 17, 2014

(54) MOTION PICTURE FILE ENCRYPTION METHOD AND DIGITAL RIGHTS MANAGEMENT METHOD USING THE SAME

(75) Inventors: Dong-kyoo Shin, Seoul (KR); Jun-il Kim, Yangju-si (KR); Dong-il Shin, Seoul (KR); Yong-bin Kim, Seoul (KR); Soon-yong Choi, Seoul (KR)

(73) Assignees: Samsung Electronics Co., Ltd., Suwon-si (KR); Sejong Industry-Academy Cooperation Foundation, Seoul (KR)

( * ) Notice: Subject to any disclaimer, the term of this patent is extended or adjusted under 35 U.S.C. 154(b) by 1975 days.

(21) Appl. No.: 11/006,738

(22) Filed: Dec. 8, 2004

(65) Prior Publication Data

US 2005/0123136 A1 Jun. 9, 2005

(30) Foreign Application Priority Data

Dec. 8, 2003 (KR) .......................... 10-2003-0088795

(51) Int. Cl.
*H04N 7/167* (2011.01)

(52) U.S. Cl.
USPC ........... 380/217; 380/229; 713/176; 713/193; 725/19; 725/21; 725/89; 709/230; 370/259; 386/259; 704/500

(58) Field of Classification Search
USPC ......... 725/19, 21, 89; 380/229, 217; 713/176, 713/193; 709/230; 370/259; 386/259; 704/500
See application file for complete search history.

(56) References Cited

U.S. PATENT DOCUMENTS

| | | | |
|---|---|---|---|
| 4,697,209 A * | 9/1987 | Kiewit et al. | ................... 725/19 |
| 5,515,107 A | 5/1996 | Chiang et al. | |

(Continued)

FOREIGN PATENT DOCUMENTS

| | | |
|---|---|---|
| JP | 10-271479 A | 10/1998 |
| JP | 2000-152214 A | 5/2000 |

(Continued)

OTHER PUBLICATIONS

Japanese Office Action issued in Application No. 2006-542508, dated Oct. 12, 2010.
Alattar A M et al: "Evaluation of selective encryption techniques for secure transmission of MPEG-compressed bit-streams", IEEE Circuits and Systems, IEEE, Orlando, FL, vol. 4, May 30, 1999, pp. 340-343.

(Continued)

*Primary Examiner* — Thanhnga B Truong
(74) *Attorney, Agent, or Firm* — Sughrue Mion, PLLC

(57) ABSTRACT

A method of encrypting a motion picture file and a method of digital rights management using the same, wherein encryption method includes: extracting information on the location of at least one video sample, which is a real-time streaming unit, from meta-data of the motion picture file; extracting the video samples based on the location information; encrypting the extracted video samples, excluding a start code within a video sample header of each extracted video sample, based on predetermined encryption information; and producing an encrypted motion picture file by recombining the encrypted video samples. Since the file is encrypted in units of video object planes (VOPs) while maintaining an MEPG-4 file format, the encryption method can be easily applied to a completed file format and streaming service is also possible.

18 Claims, 11 Drawing Sheets

(56) References Cited

U.S. PATENT DOCUMENTS

| | | | |
|---|---|---|---|
| 5,960,081 A * | 9/1999 | Vynne et al. | 713/176 |
| 6,219,094 B1 * | 4/2001 | Gerlach et al. | 348/184 |
| 6,453,355 B1 * | 9/2002 | Jones et al. | 709/230 |
| 6,505,299 B1 | 1/2003 | Zeng | |
| 6,584,200 B1 | 6/2003 | Tanaka | |
| 6,701,528 B1 * | 3/2004 | Arsenault et al. | 725/89 |
| 6,914,637 B1 * | 7/2005 | Wolf et al. | 348/473 |
| 7,278,165 B2 * | 10/2007 | Molaro | 726/27 |

FOREIGN PATENT DOCUMENTS

| | | |
|---|---|---|
| JP | 2001-103444 A | 4/2001 |
| JP | 2001-203683 A | 7/2001 |
| JP | 2002-353957 A | 12/2002 |
| JP | 2003-078519 A | 3/2003 |
| KR | 1999-0044818 A | 6/1999 |
| KR | 2001-0074604 A | 8/2001 |
| KR | 2002-0064899 A | 8/2002 |
| KR | 2002-0075060 A | 10/2002 |
| KR | 2002-0076272 A | 10/2002 |
| KR | 10-0370532 B1 | 1/2003 |
| KR | 2003-0005464 A | 1/2003 |
| KR | 2003-0006817 A | 1/2003 |
| KR | 2003-0022879 A | 3/2003 |
| WO | WO 00/04713 A1 | 1/2000 |

OTHER PUBLICATIONS

Communication dated Oct. 13, 2011 issued by the European Patent Office in counterpart European Patent Application No. 04808344.8.

ISO/IEC JTC 1/SC 29/WG 1&11: "Text of ISO/IEC FDIS 14496-12 15444-12: Information technology-Coding of audio-visual objects-pt. 12: ISO base media file format Information technology-JPEG2000 image coding system-pt. 12: ISO base media file format", Int. Org. For Standardisation, Mar. 5, 2003 pp. 1-55.

ISO/IEC JTC 1/SC 29/WG 11: "Text of ISO/IEC 14496-14/FDIS: Information technology-Coding of Audio, Picture, Multimedia and Hypermedia Information-Part 14: MP4 file format", Int. Org. For Standardisation, Apr. 30, 2003, pp. 1-10.

Qiong Liu et al: "Digital Rights Management for Content Distribution", Proceedings of the Australian Info Security Workshop Conference on a ACSW Frontiers 2003, Adelaide, Australia, Feb. 1, 2003, pp. 49-58.

Yongcheng Li et al: "Security enhanced MPEG player", Multimedia Software Develop., Proceedings, Int. Workshop on Berlin, Germany Mar. 25-26, 1996, Los Almitos, CA, IEEE Comput. Soc, US, Mar. 25, 1996 pp. 169-175.

Communication dated Apr. 16, 2012 issued by the European Patent Office in counterpart European Application No. 04808344.

* cited by examiner

FIG. 11

```
QTAtom firstAtom;
QTAtomContainer container;
OSErr err;
err = QTNewAtomContainer (&container);
if(!err)
err = QTInsertChild (container, kParentAtomIsContainer,
        drma', 1000, 1, 0, nil, &firstAtom);
```

MOTION PICTURE FILE ENCRYPTION METHOD AND DIGITAL RIGHTS MANAGEMENT METHOD USING THE SAME

BACKGROUND OF THE INVENTION

This application claims the priority from Korean Patent Application No. 2003-88795, filed on Dec. 8, 2003, in the Korean Intellectual Property Office, the disclosure of which is incorporated herein in its entirety by reference.

1. Field of the Invention

The present invention relates to a method of encrypting a motion picture file and a method of managing digital rights using the same, and more particularly, to a method of encrypting a motion picture file while maintaining the format of the motion picture file so that a streaming service under digital rights management is possible, and a method of digital rights management using the encryption method.

2. Description of the Related Art

Currently, service providers provide multi-media data to users in the form of download service or streaming service. Download service enables an entire multi-media file to be downloaded from a service provider's computer to a user's computer and then reproduced. Streaming service is when a service provider segments a file into real-time refreshable segments and transmits the segments to a user who reproduces the segments in real-time.

Whichever service is provided by the service provider, the user has to complete a process of acquiring legitimate rights for relevant multi-media data before being able to reproduce the files. A user who attempts to access the files without acquiring legal rights to the files should be blocked. To facilitate such selective provision and denial of access, multi-media files are encrypted.

Digital rights management (DRM) is a solution for all sorts of systems that only allow users with legal rights to access encrypted files. Generally, a DRM system includes a contents provider, a user, a DRM server, and so on, and can include an electronic payment process, a user authentication process, and a public key infrastructure (PKI).

The most basic DRM method is encrypting a Motion Picture Experts Group (MPEG) file, transmitting the encrypted MPEG file to a user, and then providing a key that can decrypt the encrypted file to the user if it is confirmed through a user authentication process that the user has legal rights. The user authentication process can include an electronic payment process and a PKI can be used for transmitting the key.

However, such an encryption method cannot be used for streaming service because decryption is possible only after downloading the entire file. That is, even if a user key is transmitted from the DRM server, reproduction of the corresponding file is not possible until the entire encrypted file is downloaded.

Another encryption method involves encrypting discrete cosine transform coefficients, for example, AC or DC values, during a motion picture file encoding process.

This method, however, does not encrypt a completed motion picture file but adds an additional encryption process to a motion picture file encoding process. As a result, this method cannot be easily applied to a completed motion picture file. In addition, if a contents provider has to apply an encryption algorithm that is specifically designated for the contents provider in a motion picture file production process, the contents provider has the disadvantage of having to depend on a motion picture file provider to provide the service. This inhibits the growth and development of the on-line contents industry.

SUMMARY OF THE INVENTION

Illustrative, non-limiting embodiments of the present invention overcome the above disadvantages and other disadvantages not described above. Also, the present invention is not required to overcome the disadvantages described above, and illustrative, non-limiting embodiment of the present invention may not overcome any of the problems described above.

The present invention provides an encryption method that can be applied to streaming service and at the same time easily applied to a complete motion picture file without taking part in a motion picture file production process, and a digital rights management method using the encryption method.

According to an aspect of the present invention, there is provided a method of encrypting a motion picture file that comprises a media data region and a meta-data region, the encryption method comprising extracting information on the location of at least one video sample, which is a real-time streaming unit, from meta-data of the motion picture file; extracting the at least one video sample based on the location information; encrypting the extracted video samples, excluding a start code within a video sample header of each extracted video sample, based on predetermined encryption information; and producing an encrypted motion picture file by recombining the encrypted video samples.

Extracting location information of the at least one video sample may include checking whether a video media information atom exists among lower level atoms of a moov atom; when the video media information atom exists, extracting a chunk size, a chunk offset, and a sample size from a chunk offset atom and a sample size atom; and calculating an offset of each video object plane (VOP) based on the extracted chunk size, the chunk offset, and the sample size.

According to another aspect of the present invention, there is provided a method of decrypting an MPEG-4 file encrypted in units of VOPs based on predetermined encryption information, the decryption method including: detecting a start code of each VOP within the MPEG-4 file; extracting each VOP based on the start code; extracting encrypted VOPs among the extracted VOPs based on encryption information; decrypting the encrypted VOPs based on decryption information that corresponds to the encryption information; and reproducing the decrypted MPEG-4 file by recombining the decrypted VOPs.

The encryption information may include a decryption key, an encryption type, an encryption mode, and a VOP ID.

According to another aspect of the present invention, there is provided a method of a digital rights management comprising: a contents server and a contents client receiving encryption and decryption information by carrying out a user authentication process for a predetermined MPEG-4 file through a DRM server; the contents server encrypting a relevant MPEG-4 file in units of VOPs based on the encryption information; transmitting a packet that includes the VOPs of the encrypted MPEG-4 file to the contents client through a streaming server; the contents client extracting the encrypted VOPs from the packet; decrypting the extracted VOPs using the decryption information; and reproducing the decrypted MPEG-4 file in real-time by recombining the decrypted VOPs.

BRIEF DESCRIPTION OF THE DRAWINGS

The aspects of the present invention will become more apparent by describing in detail exemplary embodiments thereof with reference to the attached drawings in which:

FIG. 11 is a diagram of an example of an application program interface code that produces an atom.

DETAILED DESCRIPTION OF ILLUSTRATIVE, NON-LIMITING EMBODIMENTS OF THE INVENTION

The present invention will now be described more fully with reference to the accompanying drawings, in which exemplary embodiments of the invention are shown.

Figure 1:
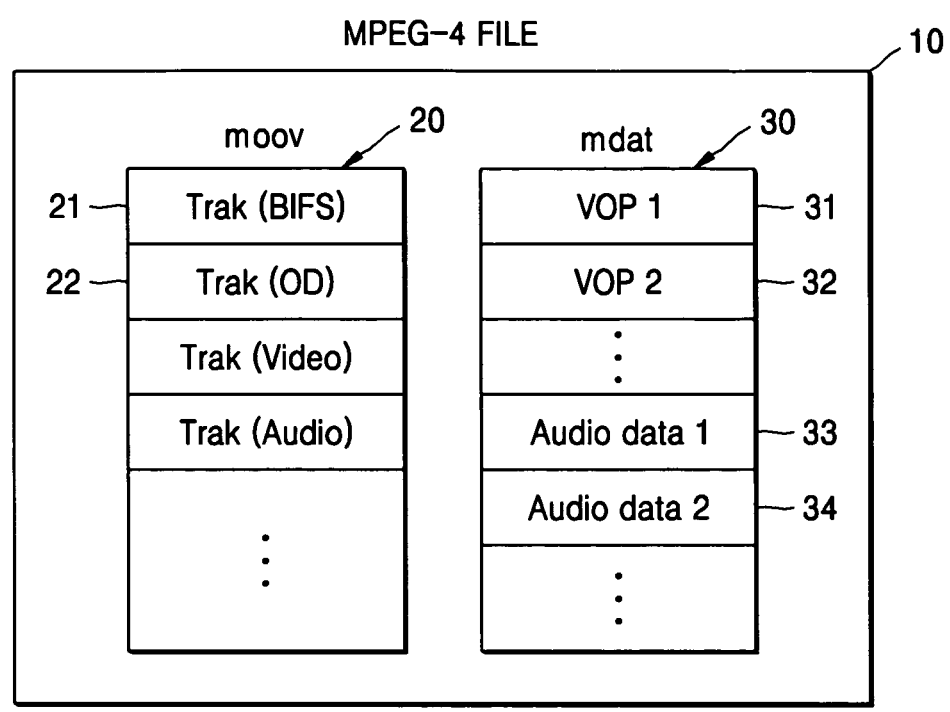
FIG. 1 is a diagram of a motion picture file format.

FIG. 1 is a diagram of a motion picture file format.

The motion picture file includes MPEG-1, MPEG-2, and MPEG-4 file formats. Each motion picture file is divided into a media data region which includes user data, and a meta-data region which stores meta-data needed for reproducing the file, such as the location and size of the user data. Below, an exemplary embodiment of the present invention applied to an MPEG-4 file format will be described.

An MPEG-4 file 10 includes a number of atoms 20, 21, 22, 30, 31, and 32. Each atom 20, 21, 22, 30, 31, and 32 has lower level atoms, thus forming a layered structure. Here, a higher atom is called a container atom and a lower atom is called a leaf atom. The two top-level atoms are a moov atom 20 and a media data atom mdat 30. User media data, i.e., audio or video data that is saved inside an MPEG file, is saved in the media data atom 30. Information regarding media data, i.e., meta-data, is saved in the moov atom 20. The media data atom 30 includes a plurality of video object planes VOP 31, 32, and so on, and audio data 33 and 34.

Figure 2:
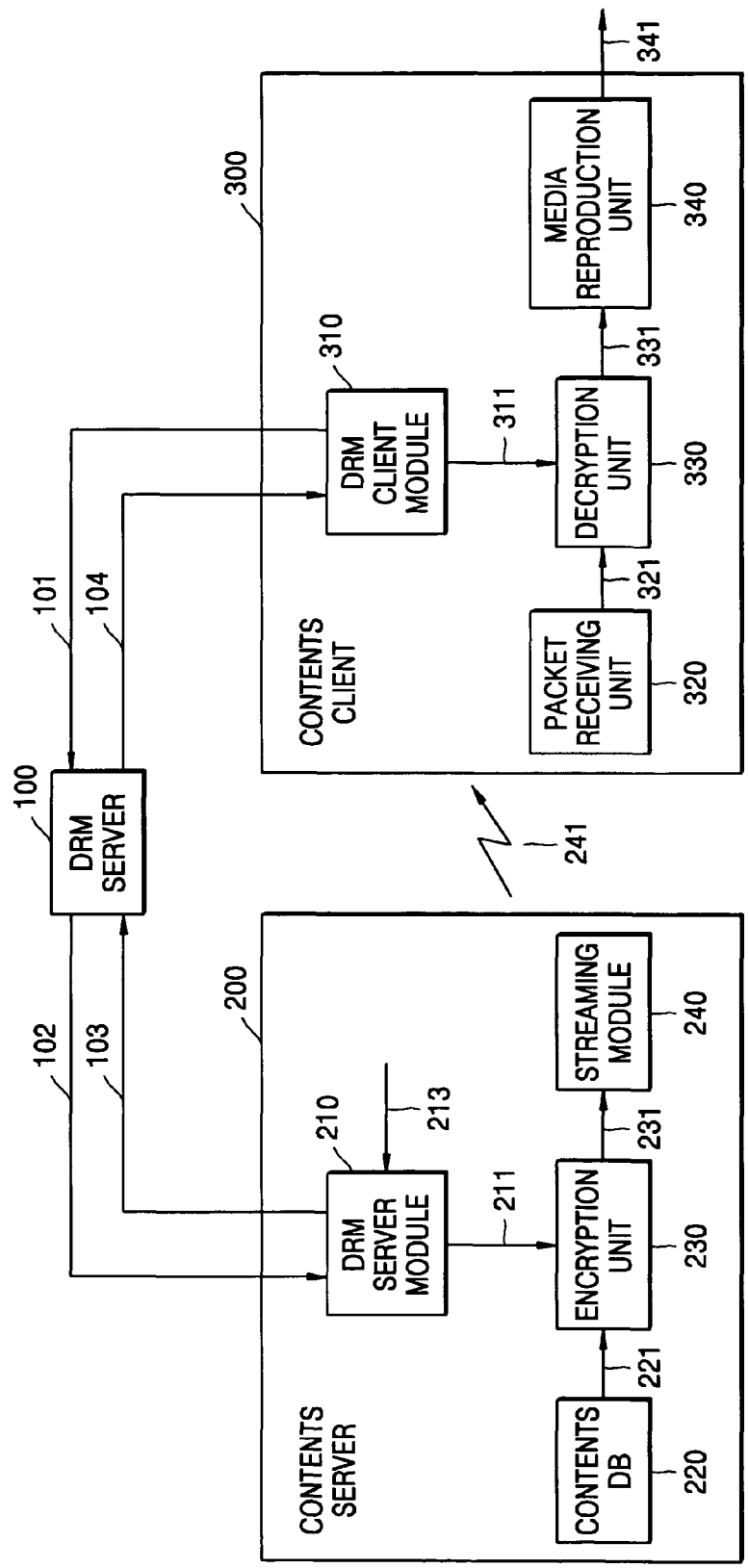
FIG. 2 is a schematic diagram of a digital rights management system according to an exemplary embodiment of the present invention.

FIG. 2 is a schematic diagram for explaining a digital rights management system according to the present invention.

A system for digital rights management (DRM) includes a contents server 200 and a contents client 300. The contents server 200 provides media data to a user and includes a DRM server module 210, a contents database 220, an encryption unit 230, and a streaming module 240. The contents client 300 receives contents from the contents server 200 and reproduces the contents, and includes a DRM client module 310, a packet receiving unit 320, a decryption unit 330, and a media reproduction unit 340.

A DRM server 100 carries out user authentication and transmission of a key between the contents server 200 and the contents client 300. When the DRM client module 310, within the contents client 300, sends a request for user authentication 101 to the DRM server 100, the DRM server 100 carries out the user authentication process using an electronic payment system (not shown). After the user authentication is completed, the DRM server 100 produces DRM authentication information 102 using, for example, user information that has been used to perform user authentication. Then, the produced DRM authentication information 102 is transmitted to the contents server 200.

The DRM server module 210, within the contents server 200, produces an encryption key from DRM authentication information 102 that is transmitted from the contents client 300, and sends the encryption key and optional encryption information 213 input by the user to the encryption unit 230 as encrypted information 211. The optional encryption information 213 includes a type of encryption method, a VOP ID, which is the object of encryption, an encryption mode, and so on.

The DRM server module 210 within the contents server 200 and the DRM client module 310 within the contents client 300 carry out the user authentication process with the DRM server 100. The DRM server module 210 receives the DRM authentication information 102 from the DRM server 100 and uses the DRM authentication information 102 to produce the encryption key. Also, the DRM server module 210 sends the encryption information 211, which includes the encryption key and the optional encryption information 213 input by the user, to the encryption unit 230. In addition, the DRM server module 210 produces DRM encryption information 103 using the encryption information 211 and other information needed for the DRM service, and sends the DRM encryption information 103 to the DRM server 100.

The DRM server 100 performs user authentication process and produces DRM decryption information 104 by adding various information received from the user authentication process to the DRM encryption information 103 received from the DRM server module 210, and sends the DRM decryption information 104 to the DRM client module 310. If the DRM service uses a symmetrical key structure, the encryption key included in the DRM encryption information 103 and a decryption key included in the DRM decryption information 104 are the same. If the DRM service uses an asymmetrical key structure, however, the encryption key and the decryption key differ. As a result, the DRM encryption information 103 and the DRM decryption information 104 are different.

The DRM client module 310 receives the DRM decryption information 104 from the DRM server 100 and extracts decryption information 311 from the DRM decryption information 104. The decryption unit 330 decrypts the motion picture file using the decryption information 311.

In FIG. 2, the encryption unit 230 within the contents server 200 produces encrypted contents 231 by receiving contents 221 from a contents database 220 and encrypting the contents 221. According to the exemplary embodiment of the present invention, the contents 221 and the encrypted contents 231 have the same MPEG-4 file format illustrated in FIG. 1.

Figure 3:
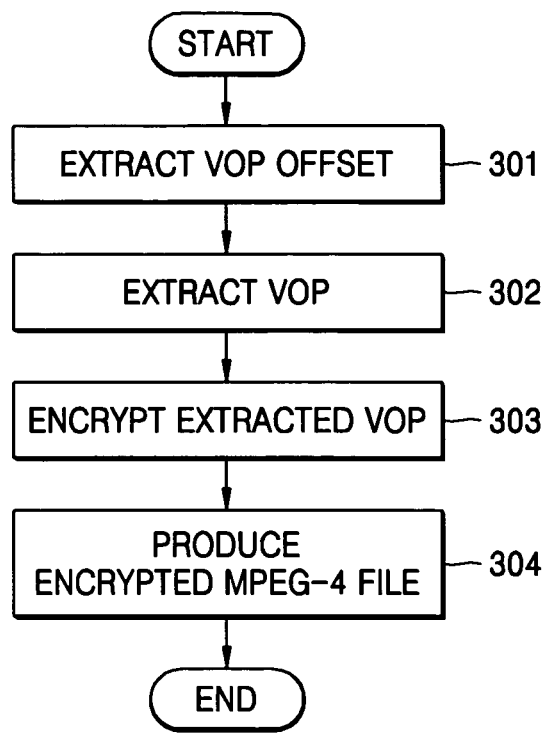
FIG. 3 is a flowchart of an MPEG-4 file encryption method according to an exemplary embodiment the present invention.

FIG. 3 is a flowchart of an MPEG-4 file encryption method according to an exemplary embodiment the present invention.

In accordance with the exemplary embodiment of the present invention, an MPEG-4 file is encrypted in units of VOPs, rather than encrypting the MPEG-4 file as a whole. A VOP that is to be encrypted can be selected through the optional encryption information 213. The encryption method is a block encryption method such as a data encryption standard (DES) or a 128-bit type standard Korean encryption algorithm (SEED). Since the encryption method is a block encryption method, it does not change the size and form of the original MPEG-4 file. In other words, the size and format of the MPEG-4 file before and after encryption are the same. Therefore, a reproduction algorithm of the original MPEG-4 file can be used without any modification. Also, although encryption is carried out in units of VOPs, the first 4 bytes of each VOP are not encrypted because the first 4 bytes are a start code used to extract the VOP at the contents client 300.

An offset of each VOP is extracted from the moov atom of the MPEG-4 file received from the contents database (operation 301). The offset of a VOP refers to location information of the VOP within the MPEG-4 file. With offset of each VOP as a basis, VOPs selected by the optional encryption information 213 are extracted (operation 302). Extracted VOPs are encrypted using DES or SEED (operation 303). An encrypted MPEG-4 file is produced by combining the encrypted VOPs and non-encrypted VOPs (operation 304).

Below, an offset extraction process for each VOP of the MPEG-4 file will be described with reference to FIGS. 4 through 6.

Figure 4:
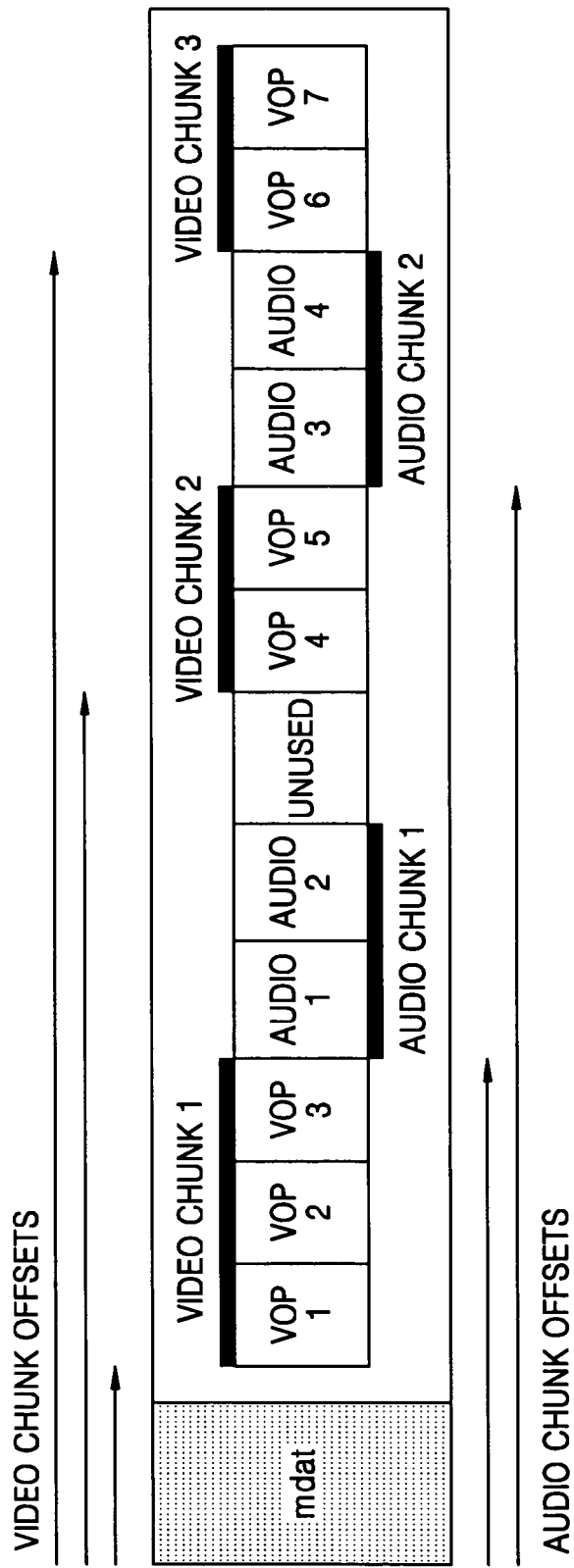
FIG. 4 is a structural diagram of a media data atom of an MPEG-4 file.

FIG. 4 is a structural diagram of a media data atom of an MPEG-4 file.

Depending on an MPEG-4 file format, a media data atom includes a chunk where actual media data exists and an unused portion where media data does not exist. The chunk includes a video chunk and an audio chunk, and each chunk is divided into a number of samples. When the media data included in the chunk is video data the sample is a VOP.

Figure 5A:
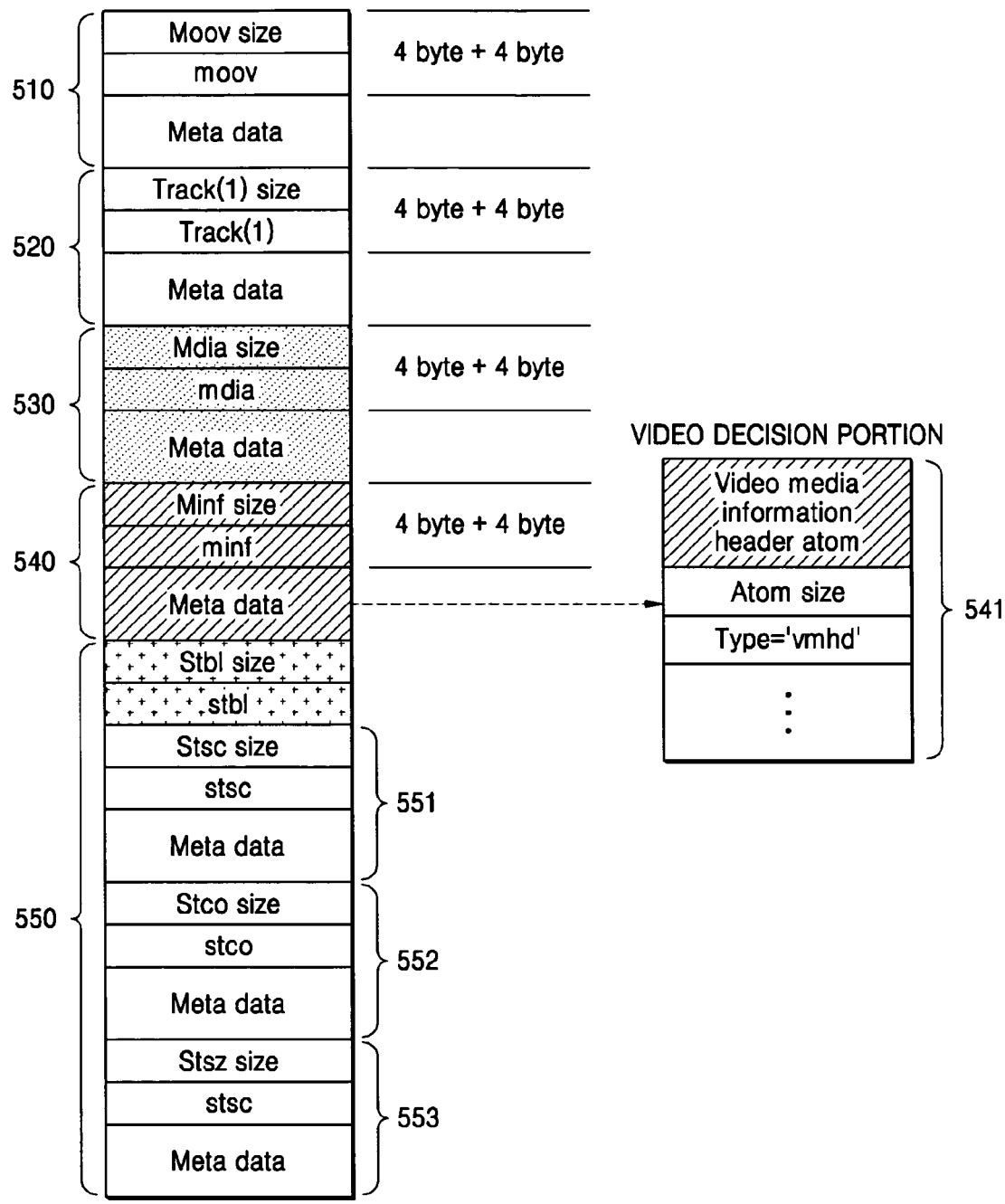
FIG. 5A is a structural diagram of a moov atom of an MPEG-4 file.

FIG. 5A is a structural diagram of a moov atom of an MPEG-4 file.

A moov atom 510 includes a number of track atoms (Track 1) 520 and each track atom (Track 1) 520 includes a media atom 530 as a lower level atom, the media atom 530 includes a media information atom 540 as a lower level atom, and the media information atom 540 includes a sample table atom 550 as a lower level atom.

The first 4 bytes of each atom have information on the size of the atom, the next 4 bytes have information on the type of the atom, and the rest of the region has meta-data information which the atom shows. The media information atom 540 also has a video information atom 541 as a lower level atom. The video information atom 541 shows that corresponding media data is video data. The sample table atom 550 has a chunk size atom 551, a sample number atom 552, and a sample size atom 553, as lower level atoms.

Figure 5B:
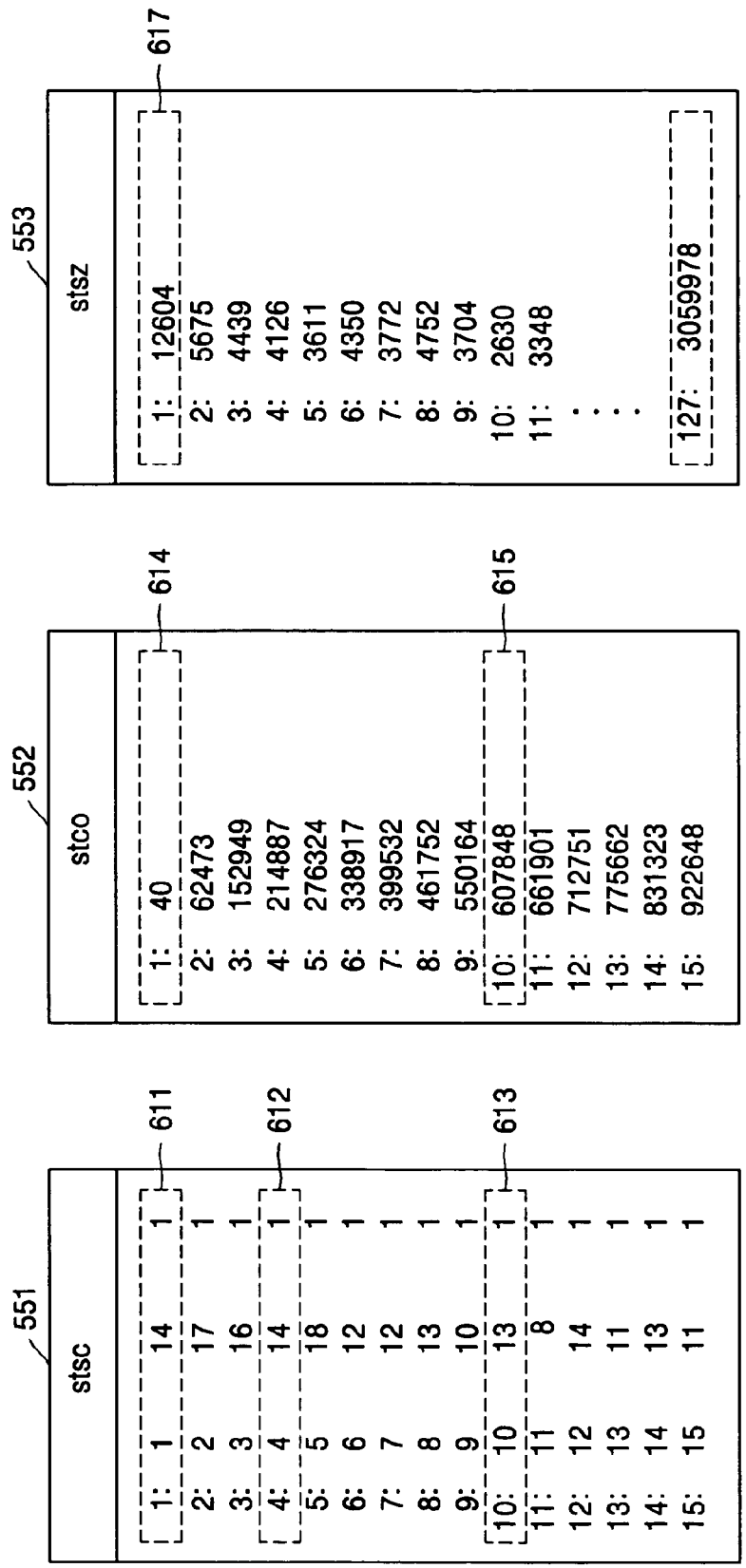
FIG. 5B is a diagram of an inner structure of a chunk size atom, a sample number atom, and a sample size atom.

FIG. 5B is a diagram of the inner structure of the chunk size atom 551, the sample number atom 552, and the sample size atom 553.

In the first diagram of FIG. 5B, information on the number of samples in each chunk is included in a meta-data region of the chunk size atom 551. This diagram shows that the first and fourth chunks 611 and 612 each have 14 video samples and the tenth chunk 613 has 13 video samples. In the second diagram of FIG. 5B, information on the location of each chunk is included in a meta-data region of the sample number atom 552. This diagram shows that the first chunk 614 is shown from 40 bits and the tenth chunk 615 from 607848 bits. In the third diagram of FIG. 5B, the sample size atom 553 shows information on the size of each sample. This diagram shows that the first sample 617 has a size of 12604 bits.

A process of extracting the offset of each VOP within the MPEG-4 file is carried out through parsing the meta-data. First, it is determined whether the video media information atom 541 exists within the media information atom 540 by confirming that the corresponding media data is video data. If the media data is video data, the media data is parsed to the sample table atom 550, which is the next lower level atom, to extract the meta-data.

From the combination of information saved in the above-mentioned three atoms, offset information of the samples, that is, the VOPs, can be extracted. In the first diagram of FIG. 5B, the size of the first chunk, that is, the number of samples included in the first chunk, is 14. In the second diagram of FIG. 5B, the offset of the first chunk is 40 bits. In the third diagram of FIG. 5B, the size of the first chunk is 12604 bits. Therefore, the offset of the second chunk is 40+12604=12644 bits. Offsets of all the samples (VOPs) can be extracted using the same method.

Figure 6A:
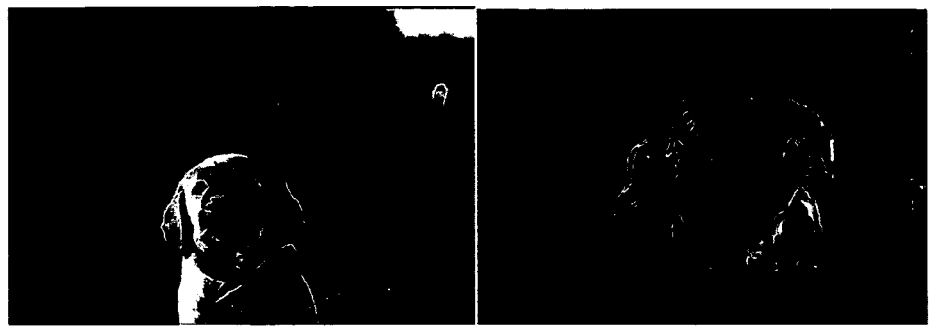
FIGS. 6A, 6B and 6C are reproduced images of an MPEG file encrypted in various ways.
Figure 6B:
Figure 6C:
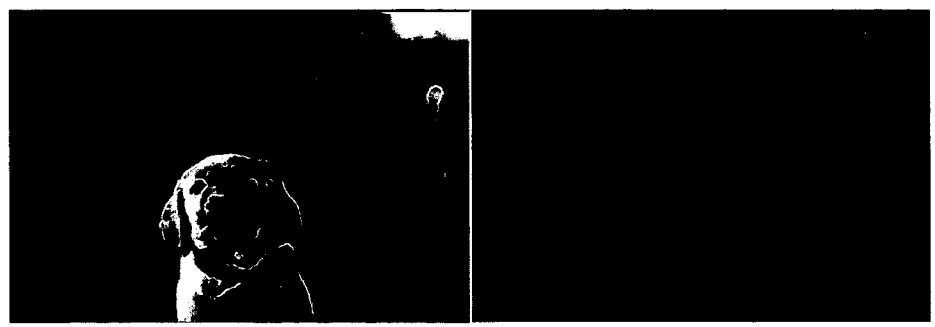

FIGS. 6A through 6C are reproduced images of an encrypted MPEG file that was encrypted in various ways.

A VOP that is to be encrypted can be selected through the optional encryption information (213). The optional encryption information (213) is input to the DRM server module (210) by the user, transmitted together with the encryption key to the encryption unit (230), and used for encryption.

Optional encryption information includes an encryption mode or an encryption identification ID. The encryption mode is divided into a first mode that encrypts all I-VOPs, a second mode that encrypts all B-VOPs and P-VOPs, and a third mode that encrypts all I-VOPs, P-VOPs, and B-VOPs. If an encryption ID is selected, only VOPs that correspond to an encryption number input as the optional encryption information are encrypted. The VOPs that are encrypted are selected regardless of their types.

In FIG. 6A, the image on the left is an image before encryption and the image on the right is an MPEG image after encryption using the first mode. Since the I-VOP is an intra-coded VOP, all information on pictorial images is included within a macroblock. Thus, it can be seen that intra-block information is completely lost. In addition, a totally different image is reproduced because reference locations of the I-VOPs, P-VOPs, and B-VOPs change.

In FIG. 6B, the image on the left is an original image before encryption and the image on the right is an MPEG image encrypted using the second mode. Information on an intra-coded macroblock and a motion vector coexist in the B-VOP and P-VOP. Therefore, the encrypted MPEG image in the second mode is more similar to the original image than the first mode. The motion vector in the P-VOP is encrypted but due to the influence of the intra-block in the I-VOP, an entire frame between continuous frames can occasionally be shown. It can be seen that only a movement path of each object becomes irregular because the motion vector is encrypted.

In FIG. 6C the image on the left is the original image before encryption and the image on the right is an MPEG image encrypted using the third mode. The third mode produces the most complete encrypted motion picture because the third mode encrypts all of the VOPs. As the number of VOPs that are encrypted increases, encryption performance increases, but more resources are required for decryption.

After encryption, by recombining encrypted VOPs, a new encrypted MPEG-4 file is produced. The produced encrypted MPEG-4 file is streamed to the contents client 300 by the streaming module 240. In order for the MPEG-4 file to be streamed, it needs to be packetized.

Figure 7:
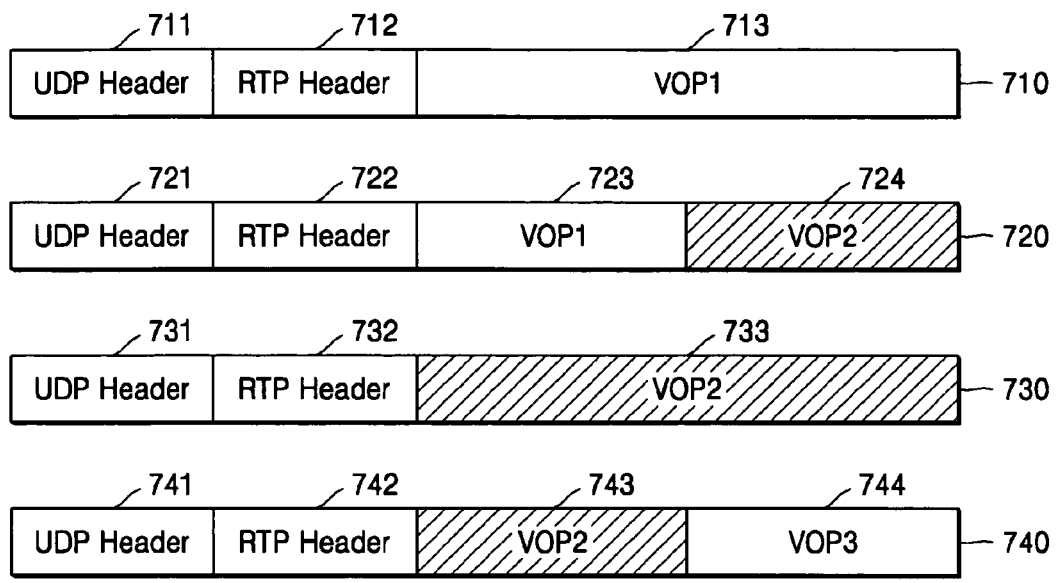
FIG. 7 is a diagram of an inner structure of transmission packets that are packetized by a streaming module.

FIG. 7 is a diagram of the inner structure of transmission packets that are packetized by a streaming module.

Referring back to FIG. 2, the streaming module 240 produces a transmission packet 241 by packetizing the received encrypted MPEG-4 file. FIG. 7 shows four transmission packets that are transmitted in chronological order. Each transmission packet 710, 720, 730, and 740 includes transmission protocol headers 711, 712, 721, 722, 731, 732, 741, and 742, and transmission data 713, 723, 724, 733, 743, and 744. The transmission protocol headers differ according to a transmission path, and generally a user data program protocol and a real-time transmission protocol are used.

The first transmission packet 710 includes a part of the first VOP (VOP1) as the transmission data 713 and the second transmission packet 720 includes the rest of the first VOP (VOP1) as the transmission data 723 and a part of the second VOP (VOP2) as the transmission data 724. The third transmission packet 730 includes another part of the second VOP (VOP2) as the transmission data 733, and the fourth transmission packet 740 includes the rest of the second VOP (VOP2) as the transmission data 743 and a part of the third VOP (VOP3) as the transmission data 744. The reason why each transmission packet has a part of the VOP as the transmission data is because the size of the VOP is different, and the length of the transmission packet and the size of the transmitted VOP do not match. In FIG. 7, the hatched portions of the transmission data 724, 733, and 743 show the encrypted VOP.

The streaming module 240 can be constructed as an independent server and separate from the contents server 200. In this case, transmission of an MPEG-4 file from the encryption unit 230 to a streaming server (not shown) is carried out over a communications network like the Internet.

Figure 8:
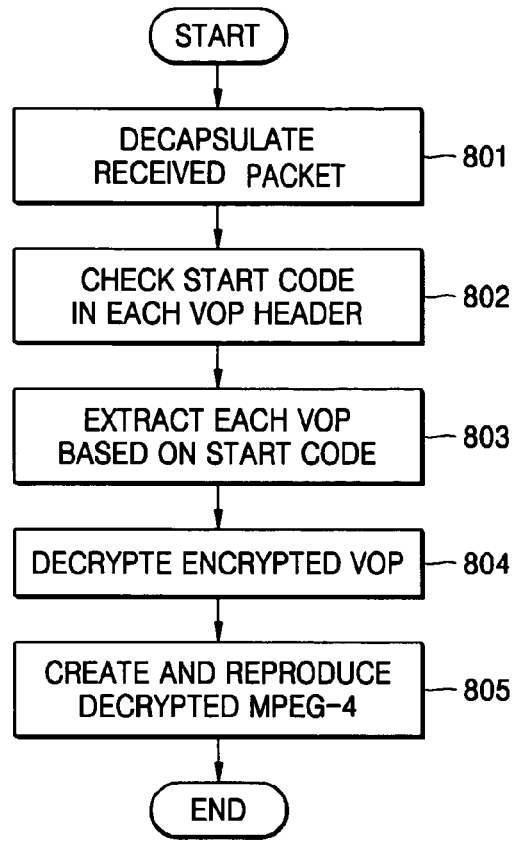
FIG. 8 is a flowchart of a method of a contents client playing an MPEG-4 file after receiving a transmission packet.

FIG. 8 is a flowchart of a method of the contents client 300 playing an MPEG-4 file after receiving the transmission packet 241.

The packet receiving unit 320 within the contents client 300 receives the transmission packet 241 and extracts a VOP. The VOP extraction process is carried out by monitoring the packets that enter a buffer within the packet receiving unit 320. First, the packet receiving unit 320 performs decapsulization by removing the transmission protocol headers 711, 712, 721, 722, 731, 732, 741, and 742 from the received transmission packet 241 (operation 801).

Next, it is checked whether a start code within the VOP header in each VOP is received (operation 802).

Figure 9:
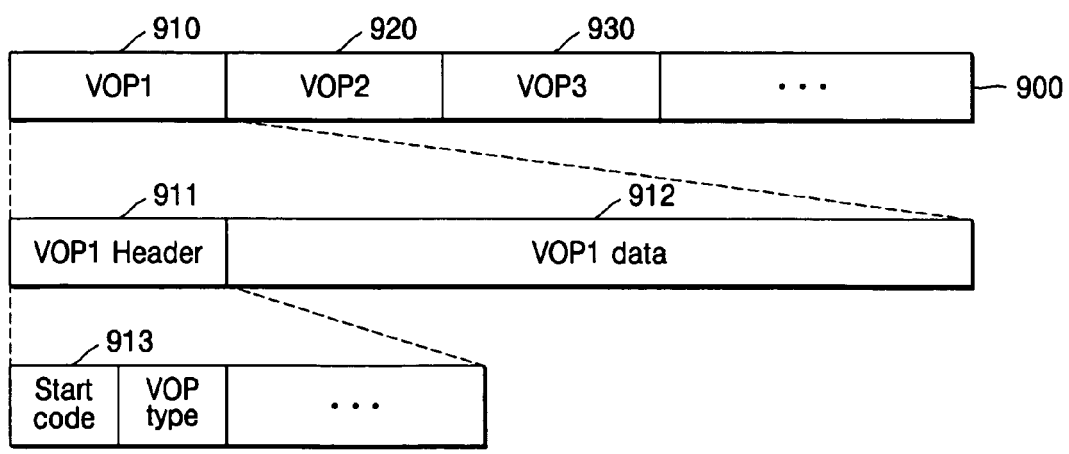
FIG. 9 is a diagram of the inner structure of transmitted video object planes (VOPs)

FIG. 9 is a diagram of the inner structure of a transmitted VOP 900. Each VOP 910, 920, 930, and so on, includes a VOP header 911 and VOP data 912, and has a start code 913 which is the first 4 bytes of each VOP header 911.

A start code is the first 4 bytes of each VOP and has a predetermined value. When the start code of a next VOP is detected, the present VOP is extracted and sent to the decryption unit 330 (operation 803).

Using the DRM decryption information 311 received from the contents server 200 through the DRM server 100, the decryption unit 330 decrypts the relevant VOP (operation 804.) The DRM encryption information 311 includes an encryption type, an encrypted VOP ID, information on an encryption mode, and an encryption key, and is sent to the decryption unit 330 through the DRM server module 210, the DRM server 100, and the DRM client module 310, respectively.

The media reproduction unit 340 creates and reproduces a decrypted MPEG-4 file after receiving decrypted VOPs from the decryption unit 330 and recombining the decrypted VOPs (operation 805).

Figure 10:
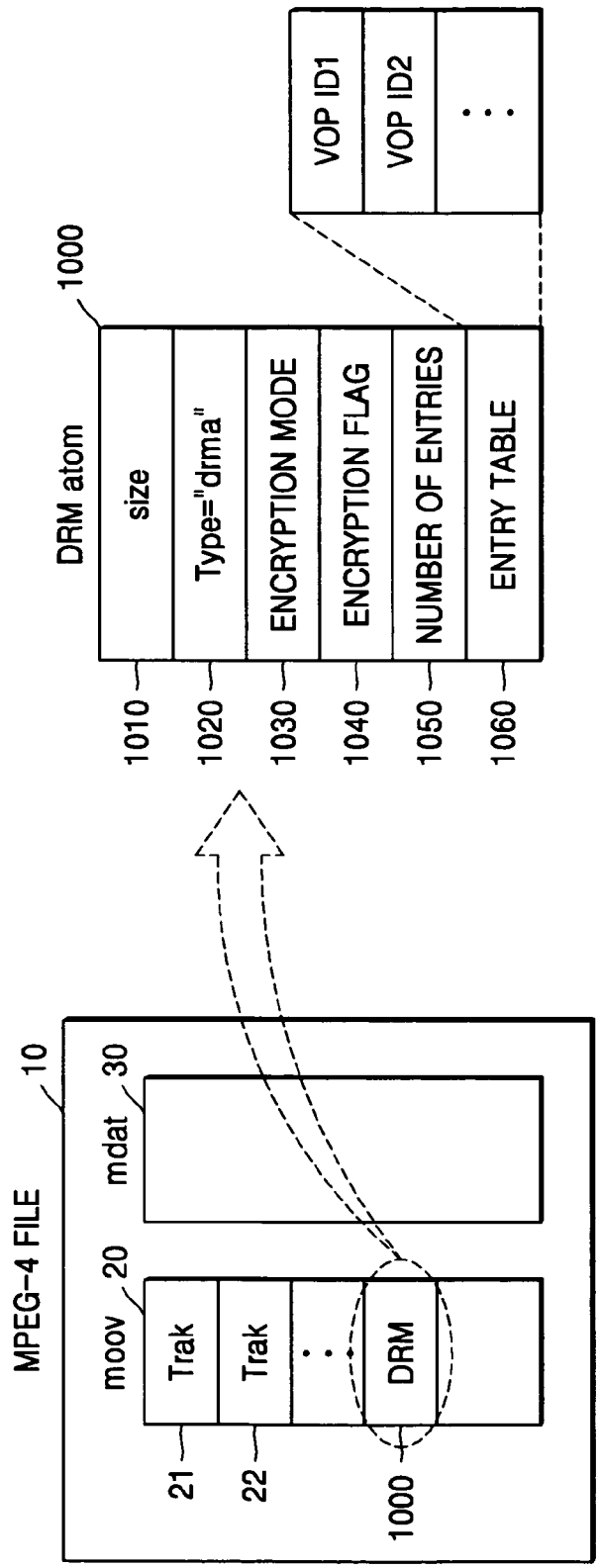
FIG. 10 is a diagram of the inner structure of a digital rights management atom according to an exemplary embodiment of the present invention.

FIG. 10 is a diagram of the inner structure of a digital rights management atom according to an exemplary embodiment of the present invention.

In another exemplary embodiment of the present invention, a new atom that is meta-data of a conventional MPEG-4 file is included. In FIG. 2, the encryption information 211 is included in the DRM encryption information 103 and is sent to the DRM server 100, but in the present exemplary embodiment, the encryption information 211 is included in a DRM atom 1000. The encryption information 211 can include an encryption key, an encryption type, an encryption mode, and an encrypted VOP ID.

The DRM atom 1000 illustrated in FIG. 10 includes an atom size 1010, an atom type 1020, an encryption mode 1030, an encryption flag 1040, a number of entries 1050, and an entry table 1060.

When the encryption flag 1040 is set as 1, it means all VOPs are encrypted and when the encryption flag 1040 is set as 0, it means only a portion of VOPs are encrypted. The VOP IDs of the portion of the VOPs that are encrypted are saved in the entry table 1060, and the number of encrypted VOPs is saved in the entry number 1050.

In order not to change the conventional MPEG-4 file format, the DRM atom 1000 is located as a top level atom within the moov atom. If the DRM atom 1000 was located at a lower level within the moov atom, the size of all of the higher level DRM atoms would have to be changed.

The present exemplary embodiment has an effect of alleviating the need for the contents client 300 to manage a separate file system on the decryption information 311 that corresponds to the encryption information 211, because the encryption information 211 is transmitted along with the MPEG-4 file.

FIG. 11 is a diagram of an example of an application program interface (API) code that produces an atom. Apple Computers, Inc. provides QuickTime as an API to produce MPEG-4 file format atoms. FIG. 11 is an example of atom production using QuickTime. According to FIG. 11, it can be seen that an atom is named "drma" and its size is set as "1000."

As described above, because a file is encrypted in units of VOPs while maintaining the MPEG-4 file format, the MEPG-4 file encryption method and the digital rights management method using the same according to the present invention are easily applicable to a completed form of a file format and streaming service is also possible.

In addition, because a file can be encrypted without taking part in an MEPG-4 file production process, independent encryption by a contents provider is possible, which will help to advance the contents providing industry.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A method of encrypting a motion picture file comprising a plurality of video samples, the method comprising:
   extracting location information of at least one video sample;
   extracting video samples based on the location information which has been extracted;
   encrypting a portion of extracted video samples, excluding video sample identifying information that identifies the extracted video samples, according to encryption information; and
   generating an encrypted motion picture file by re-inserting encrypted video samples into the motion picture file,
   wherein the motion picture file is a Moving Picture Experts Group (MPEG) file, and each of the video samples is a video object plane (VOP) which shows streaming units and which is included in a chunk.

2. The method of claim 1, wherein the encryption information includes an encryption key and an encryption type.

3. The method of claim 2, wherein the encryption key is transmitted using a digital rights management service.

4. The method of claim 2, wherein encryption is performed such that a message word before encryption has a same number of bits as a corresponding codeword after encryption.

5. The method of claim 4, wherein the encryption method is one of a data encryption standard (DES) and a standard Korean encryption algorithm (SEED).

6. The method of claim 1, wherein the extracting the location information of the at least one video sample comprises:
    extracting a chunk size, a chunk offset, and a sample size from meta-data within a sample table atom among lower level atoms within a moov atom where meta-data of VOPs is saved; and
    calculating location information of each VOP based on the chunk size, the chunk offset, and the sample size.

7. The method of claim 6, wherein the encryption information further comprises an encryption mode which is one of a first mode which encrypts only I-VOPs among the VOPs, a second mode which encrypts only B-VOPs and P-VOPs among the VOPs, and a third mode which encrypts all of the VOPs.

8. The method of claim 7, wherein the encryption information further comprises a VOP ID to identify a VOP that is to be encrypted.

9. The method of claim 8, wherein the moov atom comprises a digital rights management atom, and the digital rights management atom comprises the encryption information as meta-data.

10. The method of claim 9, wherein the digital rights management atom is saved as a top lower level atom of the moov atom.

11. The method of claim 9, wherein the digital rights management atom comprises an encryption flag and an entry table, and the encrypting comprising encrypting all VOPs when the encryption flag is set as a first type and encrypting only VOPs that are relevant to VOP ID included within the entry table when the encryption flag is set as a second type.

12. A method of decrypting a motion picture file that is selectively encrypted in units of video samples based on encryption information, the decryption method comprising:
    checking video sample identifying information that identifies a start of each of the video samples in the motion picture file;
    extracting each of the video samples based on the video sample identifying information;
    extracting encrypted video samples among the video samples which have been extracted based on the encryption information, wherein only a portion of the encrypted video samples, excluding the video sample identifying information, is encrypted;
    decrypting the encrypted video samples based on decryption information corresponding to the encryption information; and
    generating a decrypted motion picture file by re-inserting the decrypted video samples in the motion picture file.

13. The method of claim 12, wherein the encryption information comprises an encryption key and an encryption type.

14. The method of claim 12, wherein the decryption information is transmitted using a digital rights management service.

15. The method of claim 13, wherein encryption is performed such that a message word before encryption has the same number of bits as a corresponding codeword after encryption.

16. The method of claim 15, wherein an encryption method is one of a data encryption standard (DES) and a standard Korean encryption algorithm (SEED).

17. The method of claim 13, wherein the motion picture file is an MPEG file, each of the video samples is a video object plane (VOP), and the encryption information further comprises an encryption mode which is one of a first mode which encrypts only I-VOPs among the VOPs, a second mode which encrypts only B-VOPs and P-VOPs among the VOPs, and a third mode which encrypts all of the VOPs.

18. The method of claim 13, wherein the encryption information further comprises a VOP ID to identify a VOP that is to be encrypted.

* * * * *